(12) United States Patent
Sutehall

(10) Patent No.: US 6,773,205 B2
(45) Date of Patent: Aug. 10, 2004

(54) APPARATUS AND METHOD FOR CABLE INSTALLATION IN DUCTING

(75) Inventor: Ralph Sutehall, Newport (GB)

(73) Assignee: Pirelli General plc, London (GB)

(*) Notice: Subject to any disclaimer, the term of this patent is extended or adjusted under 35 U.S.C. 154(b) by 0 days.

(21) Appl. No.: 10/148,926

(22) PCT Filed: Dec. 5, 2000

(86) PCT No.: PCT/GB00/04657
§ 371 (c)(1),
(2), (4) Date: Oct. 4, 2002

(87) PCT Pub. No.: WO01/43248
PCT Pub. Date: Jun. 14, 2001

(65) Prior Publication Data
US 2003/0059259 A1 Mar. 27, 2003

(30) Foreign Application Priority Data
Dec. 6, 1999 (EP) .............................. 99309763

(51) Int. Cl.[7] .......................... F16L 7/00; F16L 1/028; E21C 29/16; B65H 16/00
(52) U.S. Cl. ................. 405/183.5; 405/184; 405/184.4; 405/174; 242/557; 242/566; 254/134.3 R
(58) Field of Search ............................. 405/183.5, 184, 405/184.1, 184.4, 177, 174; 242/364, 134, 136, 139, 138, 557, 566; 254/134.3 FT, 134.3 R, 134.3 CL

(56) References Cited
U.S. PATENT DOCUMENTS 3,258,545 A * 6/1966 Bernard, Jr. ............ 191/12.2 R
3,876,045 A * 4/1975 Knarreborg ............... 242/388.8
4,015,795 A * 4/1977 Chong ...................... 242/597.7
4,143,826 A * 3/1979 Lamperti ................. 242/564.4
4,552,323 A * 11/1985 Otis ......................... 242/594.3
4,765,553 A * 8/1988 Allard et al. ............ 242/474.5
4,768,732 A * 9/1988 Greenleaf ................... 242/557
4,923,135 A * 5/1990 Schabmuller ............... 242/364
4,949,909 A * 8/1990 Hatfield ...................... 242/557
5,551,647 A * 9/1996 Browning ................ 242/578.2
5,681,131 A * 10/1997 Goldenberg et al. ..... 405/183.5
6,198,871 B1 * 3/2001 Gregor et al. .............. 385/147
6,588,982 B2 * 7/2003 Nothofer et al. ......... 405/184.1

FOREIGN PATENT DOCUMENTS

| EP | 0420721 | 4/1991 | |
|---|---|---|---|
| EP | 0860920 | 8/1998 | |
| GB | 2277102 | * 10/1994 | ............. 242/597.4 |
| NL | 8600821 | 11/1987 | |

* cited by examiner

Primary Examiner—Jong-Suk Lee
(74) Attorney, Agent, or Firm—Finnegan, Henderson, Farabow, Garrett & Dunner, L.L.P.

(57) ABSTRACT

An apparatus for and method of installing a cable in ducting from a location intermediate the length of the ducting. The cable is provided in a coil at the location and some cable is passed from one end of the coil into a first portion of the ducting extending from the location to one end of the ducting. The remaining cable is passed from the other end of the coil into a second portion of the ducting extending from the location to the other end of the ducting.

21 Claims, 8 Drawing Sheets

APPARATUS AND METHOD FOR CABLE INSTALLATION IN DUCTING

CROSS REFERENCE TO RELATED APPLICATIONS

This application is a national phase application based on PCT/GB00/04657, filed Dec. 5, 2000, and claims the priority of European patent application no. 99309763.3, filed Dec. 6, 1999.

BACKGROUND OF THE INVENTION

1. Field of the Invention

This invention relates to installing a length of cable in ducting from a location intermediate the ends of the ducting. The invention is particularly, although not exclusively, applicable to installing optical fibre cables comprising at least one optical fibre unit disposed within an extruded sheath, the or each unit comprising a plurality of optical fibres.

2. Description of the Related Art

Heretofore, lengths of such optical fibre cables have been installed in ducting from locations intermediate the ducting ends by coiling the cable on a drum, transporting the drum to the location, mounting the drum for rotation about its axis for paying cable off the drum, rotating the drum and feeding the length of the cable into a first portion of the ducting extending from said location until the cable is installed in that portion, thereafter feeding the remainder of the cable onto the ground, locating the end of the cable and feeding the remainder of the cable into a second portion of the ducting extending from said location.

This known installation method has two main disadvantages. Firstly, the rotating drum presents a safety hazard both to installation operatives and members of the public when the location is in a public place. In this connection a typical drum rotational speed when installing optical fibre cables is 50 r.p.m. Secondly the feeding of the cable onto the ground can result in damage to the cable and additionally represents a safety hazard.

An object of the invention is to enable the above two disadvantages to be overcome.

SUMMARY OF THE INVENTION

This is broadly achieved by a method of installing a cable in ducting from a location intermediate the ends of the ducting, comprising providing the cable in a coil at the location, passing cable from one end of the coil into a first portion of the ducting extending from the location to one end of the ducting and passing cable from the other end of the coil into a second portion of the ducting extending from the location to the other end of the ducting. As will be appreciated the coil of cable does not rotate in this method and the cable is fed from the coil directly into both ducting portions.

The invention also includes apparatus for use in installing a length of cable in ducting from a location intermediate the ends of said ducting, said apparatus comprising: a generally cylindrical housing for housing the length of cable in a coiled condition, said housing comprising respective end walls removably mounted relative to opposite end portions of a generally cylindrical side wall; and a support means supporting said housing for pivotal movement about an axis transverse to the axis of the housing between a first position in which a first one of said opposite end portions is uppermost and a second position in which the second one of said opposite end portions is uppermost.

The invention also includes a method of installing a cable in ducting from a location intermediate the ends of said ducting using an apparatus as defined in the last preceding paragraph and comprising:

housing the length of cable to be installed in said housing in a coiled condition;

positioning said apparatus adjacent said location with said housing in said first position;

removing the uppermost end wall from the housing;

locating the end of the cable adjacent the end portion of the housing from which the end wall has been removed;

passing said end and part of the length of cable extending therefrom through said end portion of the housing from which the end wall has been removed and into a first portion of the ducting extending from said location;

remounting the removed end wall to the housing;

pivoting said housing about said axis transverse to the axis of the housing to said second position removing the now uppermost end wall from the housing;

locating the remaining end of the cable and passing that end and the remaining length of the cable extending therefrom through the end portion of the housing from which the end wall has been removed and into a second portion of the ducting extending from said location.

Advantageously, the length of cable may be fed into said housing at a site remote from said location said apparatus being transported to said location for positioning adjacent said location.

The support means of the apparatus may include a base and opposed stub axles mounted relative to said base and connected to opposed portions of said housing side wall.

The support means may also include means for supporting said housing in said first and second positions, which means may comprise length adjustable supports extending from said base to engage said housing at or adjacent the end portion which is lowermost when said housing is in said first or second position.

The base of the apparatus may be provided with wheels or endless tracks.

A cable guide may be positioned above said housing.

Preferably the end walls are provided with respective hubs which fit one within the other when said end walls are mounted to said opposite end portions of the housing side wall.

Advantageously, the housing side wall is provided with a closable aperture through which cable may pass.

Preferably, the housing side wall and/or the housing end walls comprises bars and/or tubes.

BRIEF DESCRIPTION OF THE DRAWINGS

In order for the invention to be well understood, a preferred embodiment thereof which is given by way of example only, will now be described with reference to the accompanying drawings, in which.

DETAILED DESCRIPTION OF THE INVENTION

Figure 1:
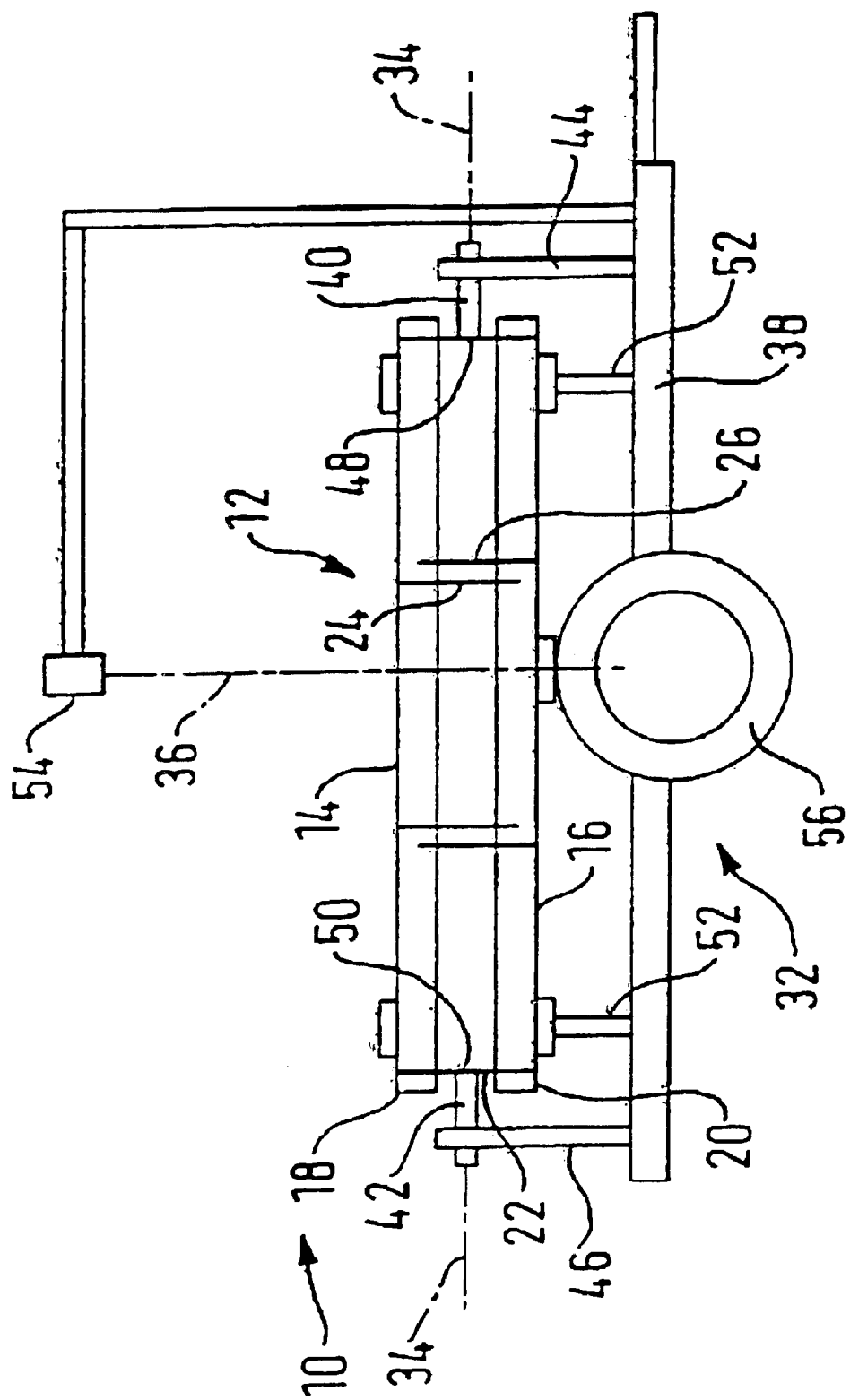
FIG. 1 schematically illustrates apparatus for use in installing a length of cable in ducting from a location intermediate the ends of the ducting.
Figure 2:
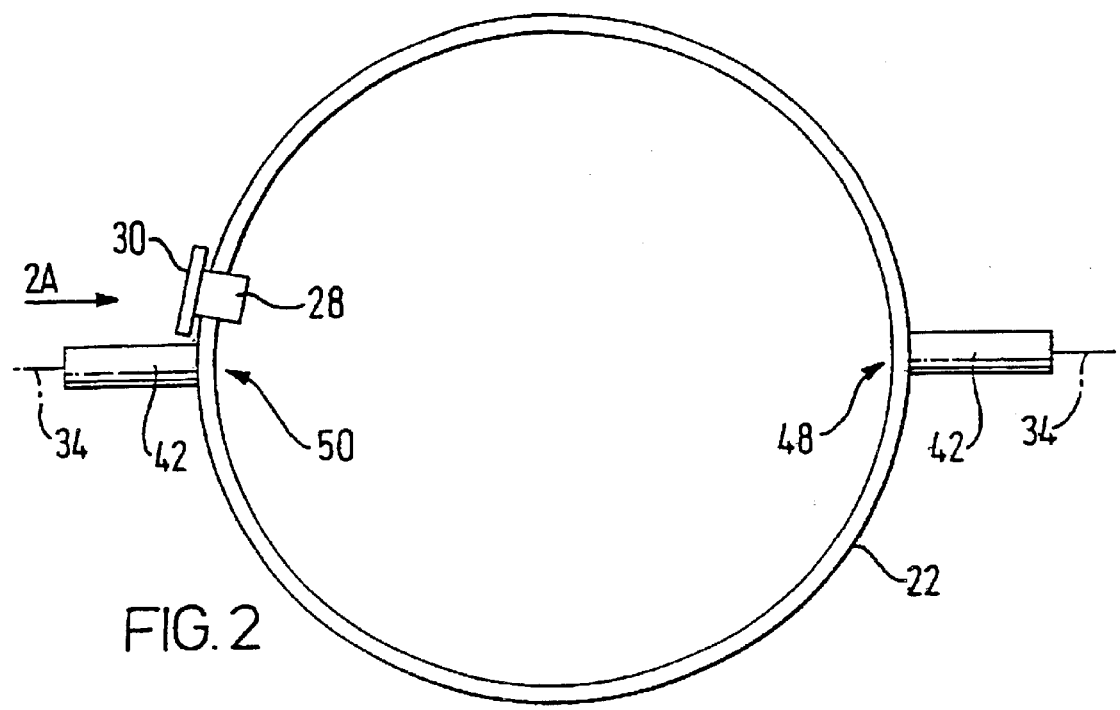
FIGS. 2 and 2A are respective plan and side schematic views of part of the housing of the apparatus, the view in FIG. 2A being taken in the direction of arrow 2A in FIG. 2.
Figure 2A:
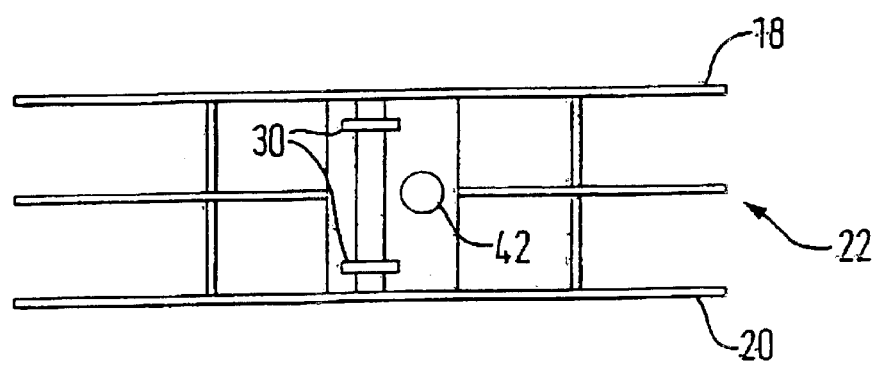

Referring first to FIG. 1, the apparatus illustrated therein and designated 10 comprises a generally cylindrical housing 12 for housing a length of cable (not shown) in a coiled condition. The housing 12 comprises respective end walls 14 and 16 which are removably mounted relative to opposite end portions 18 and 20 of a generally cylindrical side wall 22. The end walls 14 and 16 are provided with respective hubs 24 and 26 which fit one within the other when the end walls 14 and 16 are mounted to the opposite end portions 18 and 20 as illustrated in FIG. 1.

Figure 3:
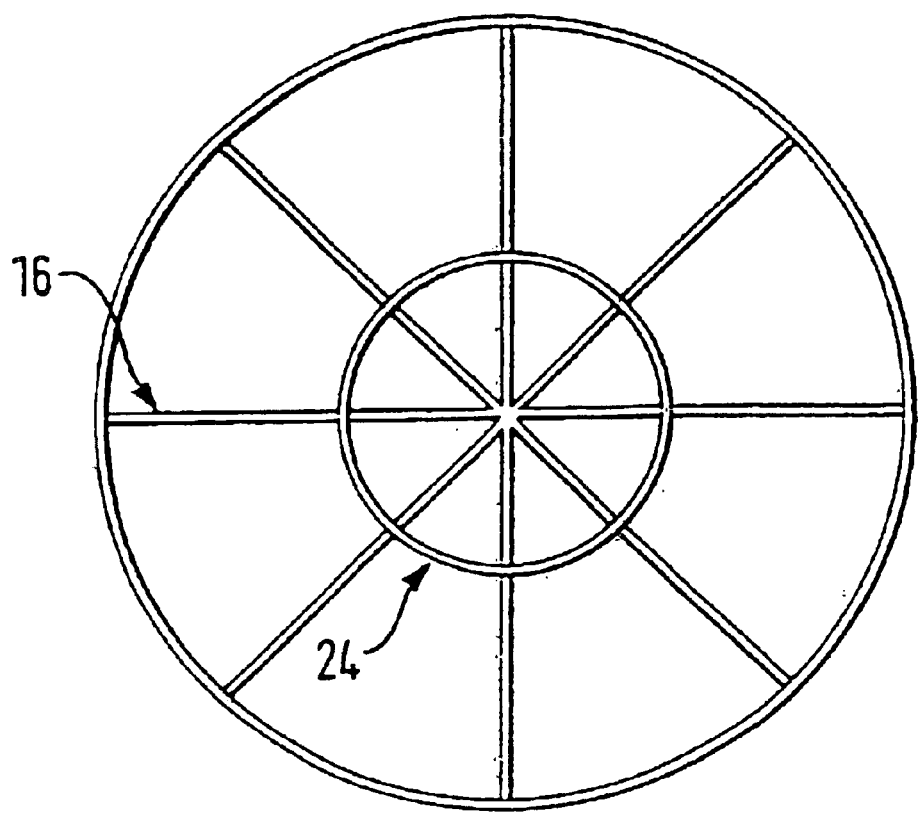
FIGS. 3 and 3A are respective plan and side schematic views of one of the end walls of the housing.
Figure 3A:
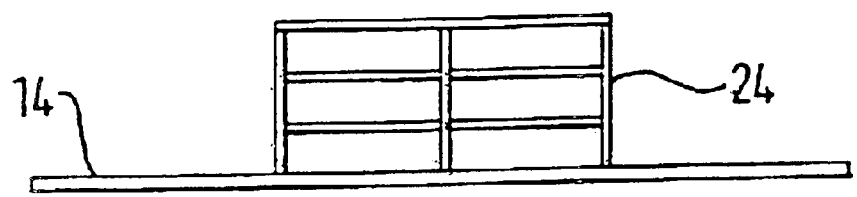

As will be understood from FIGS. 2, 2A, 3 and 3A the housing side wall 22, the end walls 14 and 16 and the hubs 24 and 26 are formed of bars and/or tubes which are connected to form grids such that the housing 12 takes the form of a cage. FIGS. 3 and 3A show end wall 14 with its hub 24 and it is to be understood that end wall 16 and its hub 26 are similarly constructed but with the hub 26 having a larger diameter than the hub 24 so that the hub 24 may fit within the hub 26 as shown in FIG. 1. The side wall 22 is provided with a slot 28 closable by a gate 30 through which cable within the housing may pass as will be explained in more detail hereinafter.

Figure 7:
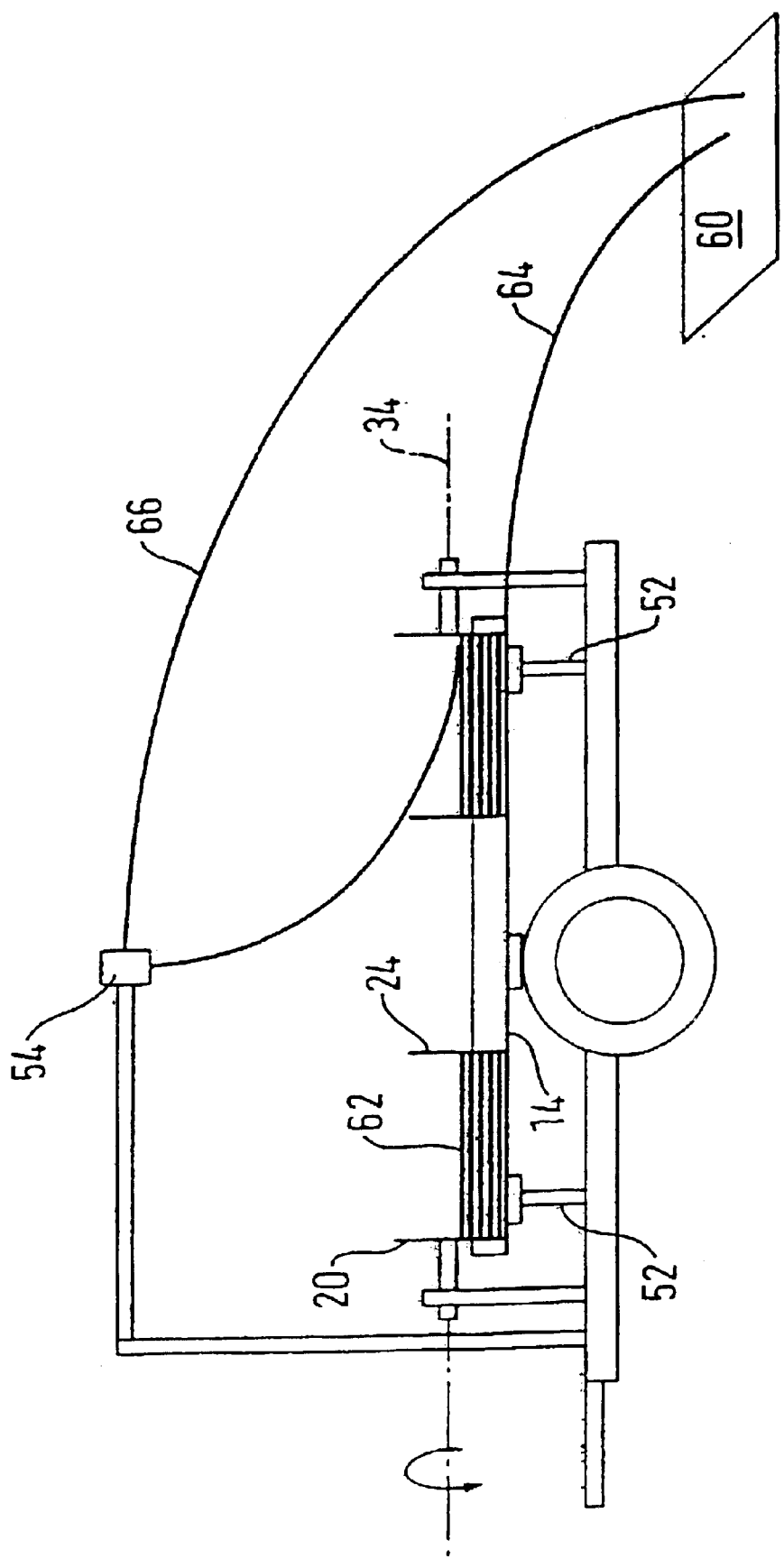

Referring back to FIG. 1, the apparatus 10 also comprises a support generally referenced 32 for supporting the housing 12 for pivotal movement about an axis 34 transverse to the axis 36 of the hoisting between a first position (as illustrated in FIG. 1) in which end portion 18 of the housing side wall is uppermost and a second position as illustrated in FIG. 7 in which end portion 20 of the housing side wall is uppermost.

To this end, the support 32 includes a base 38 and opposed stub axles 40 and 42 mounted relative to the base 38 on mountings 44 and 46 respectively and connected to opposed portions 48 and 50 of the housing side wall.

The support 32 also includes means for supporting the housing in the first and second positions mentioned above, preventing or at least limiting pivotal movement of the housing, about axis 34. The means illustrated comprise length adjustable supports 52 extending from the base 38 to engage the housing at or adjacent the end portion 18 or 20 which is lowermost when the housing is in its first or second position.

A cable guide 54 is mounted on the base 38 so as to be above the housing, and disposed on or near the housing axis 36.

The base 38 is provided with wheels 56 (one of a pair of which is shown) to enable the apparatus to be towed. Other similar means such as endless tracks may be used instead. Alternatively, the base 38 may be mounted on a truck or similar motor vehicle.

In use a length of cable is fed into the housing at a site remote from the location intermediate the ends of the ducting, for example in a factory where the cable is produced. The cable may be fed into the housing with the housing already mounted to the base 38 as illustrated in FIG. 1 or before such mounting. In each case the cable is fed through end portion 18 of the housing from which end wall 14 has been removed and is coiled about the hub 26. When the complete length of cable has been fed into the housing the previously removed end wall 14 is replaced, its hub 24 being received within hub 26.

Installation of the cable in the housing in ducting will now be described with particular reference to FIGS. 4 to 8.

Firstly, the apparatus 10 is towed to the location intermediate the ends of the ducting where access to the ducting intermediate its ends is provided. Typically this access will be provided by a pit from which a first portion of the ducting extends to one end of the ducting and a second portion of the ducting extends to the other end of the ducting. In schematic FIGS. 4 to 8 an entrance to the access pit is referenced 60 and the ducting portions, which are underground, are not illustrated.

Figure 4:
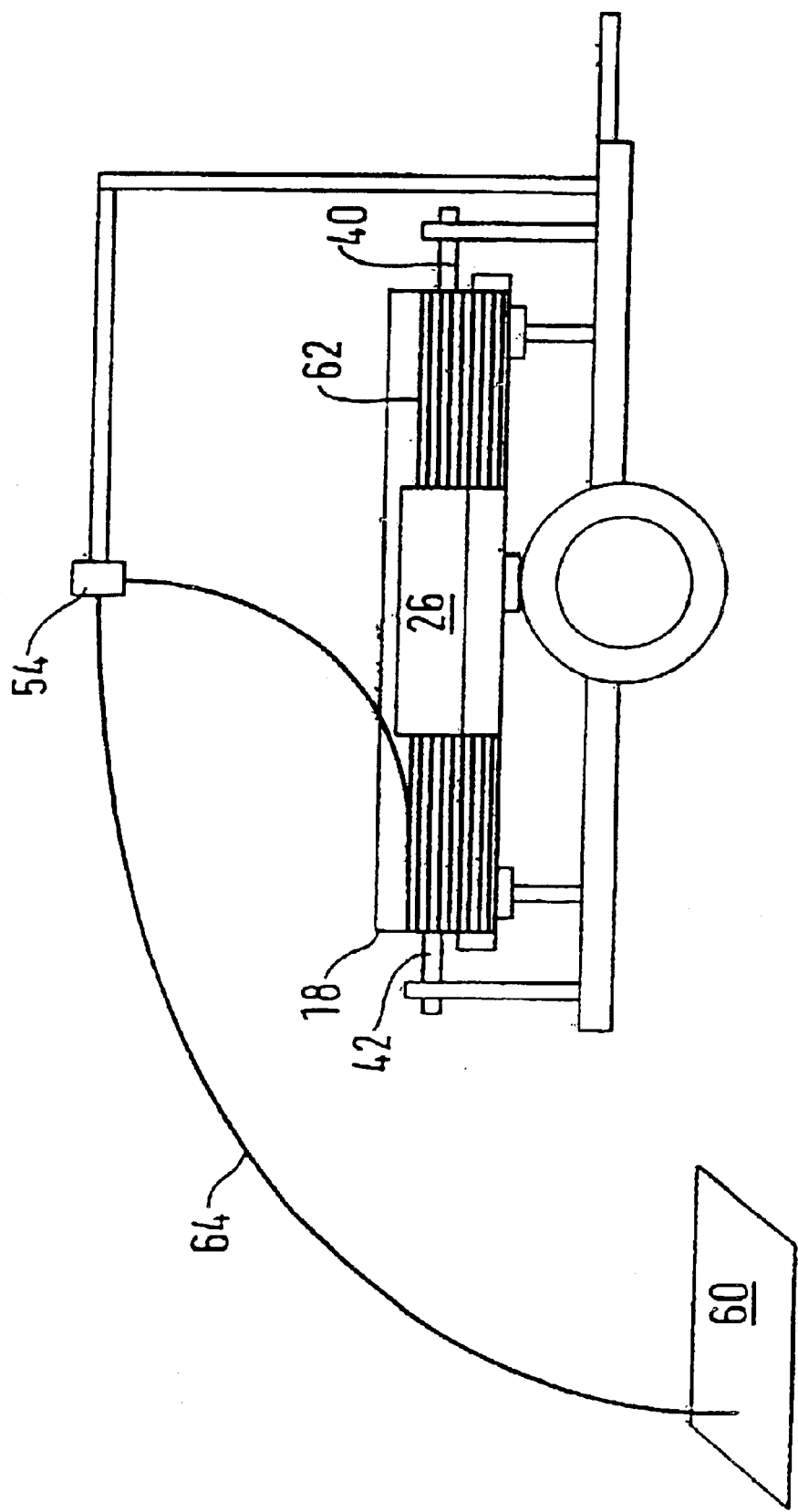
FIGS. 4 to 8 schematically illustrate successive steps in the installation of a cable using the apparatus shown in FIG. 1.

As shown in FIG. 4 the apparatus 10 is positioned adjacent the entrance 60 of the pit with the housing in its first position and with uppermost end wall 14 removed to provide access through the end portion 18 of the housing to the cable coiled within the housing. In FIGS. 4 to 8 the coil of cable in the housing is referenced 62. The end of the cable adjacent the end portion 18 of the housing is located and that end and the cable 64 extending therefrom is passed through the end portion 18 and the cable guide 54 into the access pit and through the first portion of the ducting to the end of the ducting. The cable may be passed through the ducting portion by being pulled therethrough and/or by being blown therethrough in the known manner.

Figure 5:
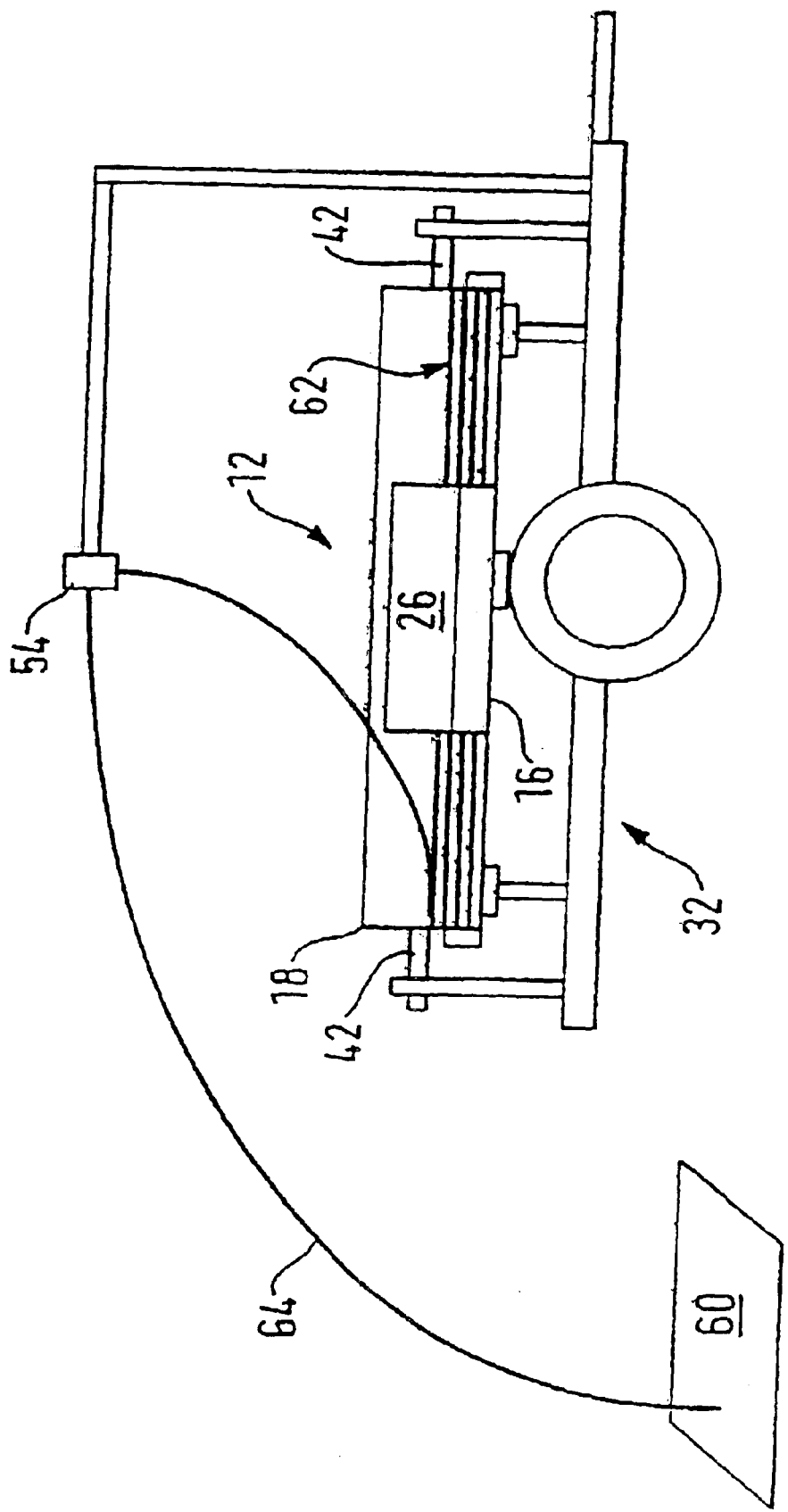

As the cable is fed into the first portion of the ducting the size of the coil 62 in the housing is reduced and FIG. 5 illustrates the situation when the cable 64 is fully installed in the first portion of the ducting.

Figure 6:
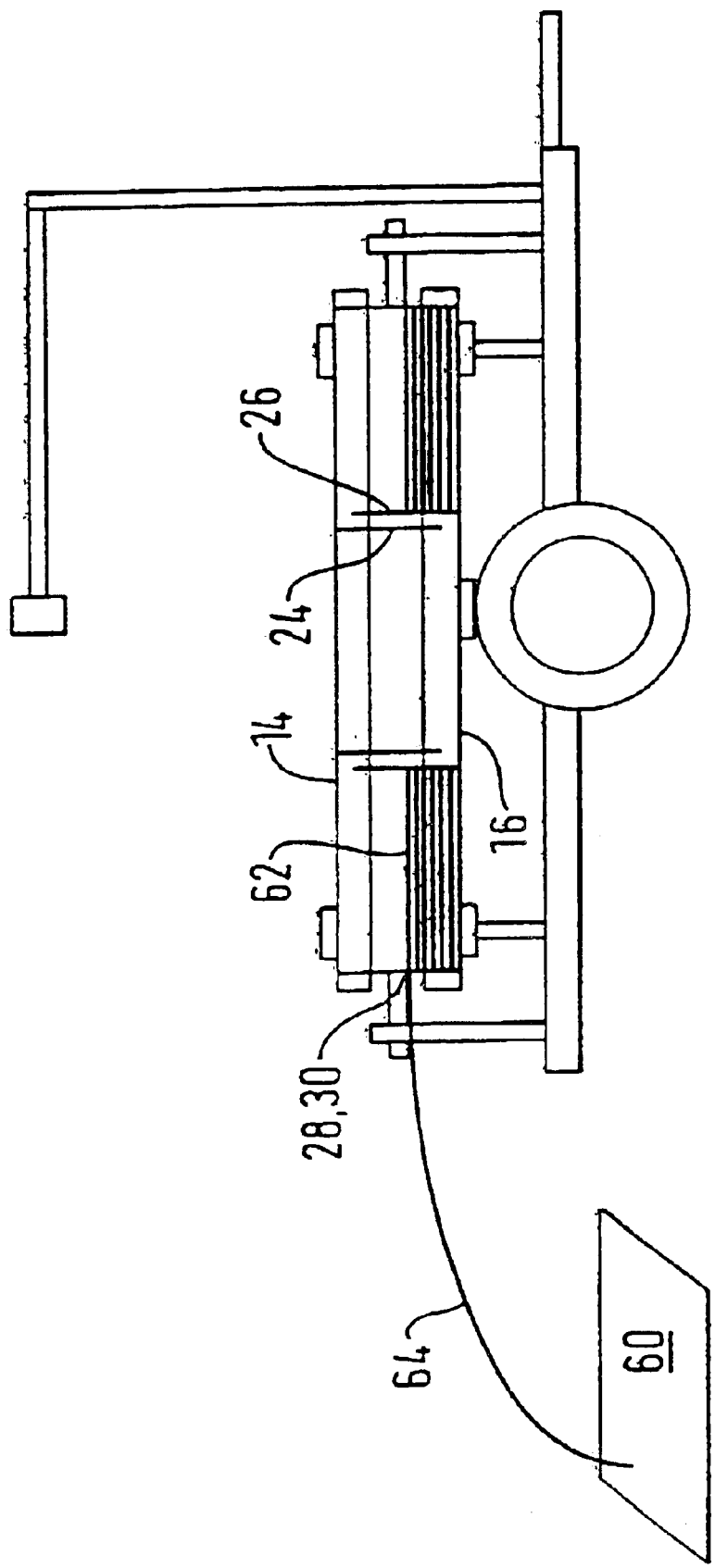

At this stage, as illustrated in FIG. 6, cable 64 is released from the cable guide and passed through the slot 28 in the side wall 22 which slot is then closed by the gate 30 to retain the cable between the end portions of the side wall. Also, the end wall 14 is remounted as shown in FIG. 6.

Next, the length adjustable supports 52 supporting the housing in its first position are removed and the housing is pivoted about axis 34 to its second position and the supports refitted to support the housing in that second position. If necessary, the apparatus is repositioned relative to the entrance 60 to the access pit as shown in FIG. 7 and as also illustrated in FIG. 7, the now uppermost end wall 16 of the housing is removed to give access through the end portion 20 of the housing to the cable coiled within the housing. The remaining end of the cable is located and that end and the cable 66 extending therefrom is passed through the end portion 20 and the cable guide 54 into the access pit and through the second portion of the ducting to the other end of the ducting. The cable 66 may be passed through the second portion of the ducting by being pulled and/or blown therethrough.

Figure 8:
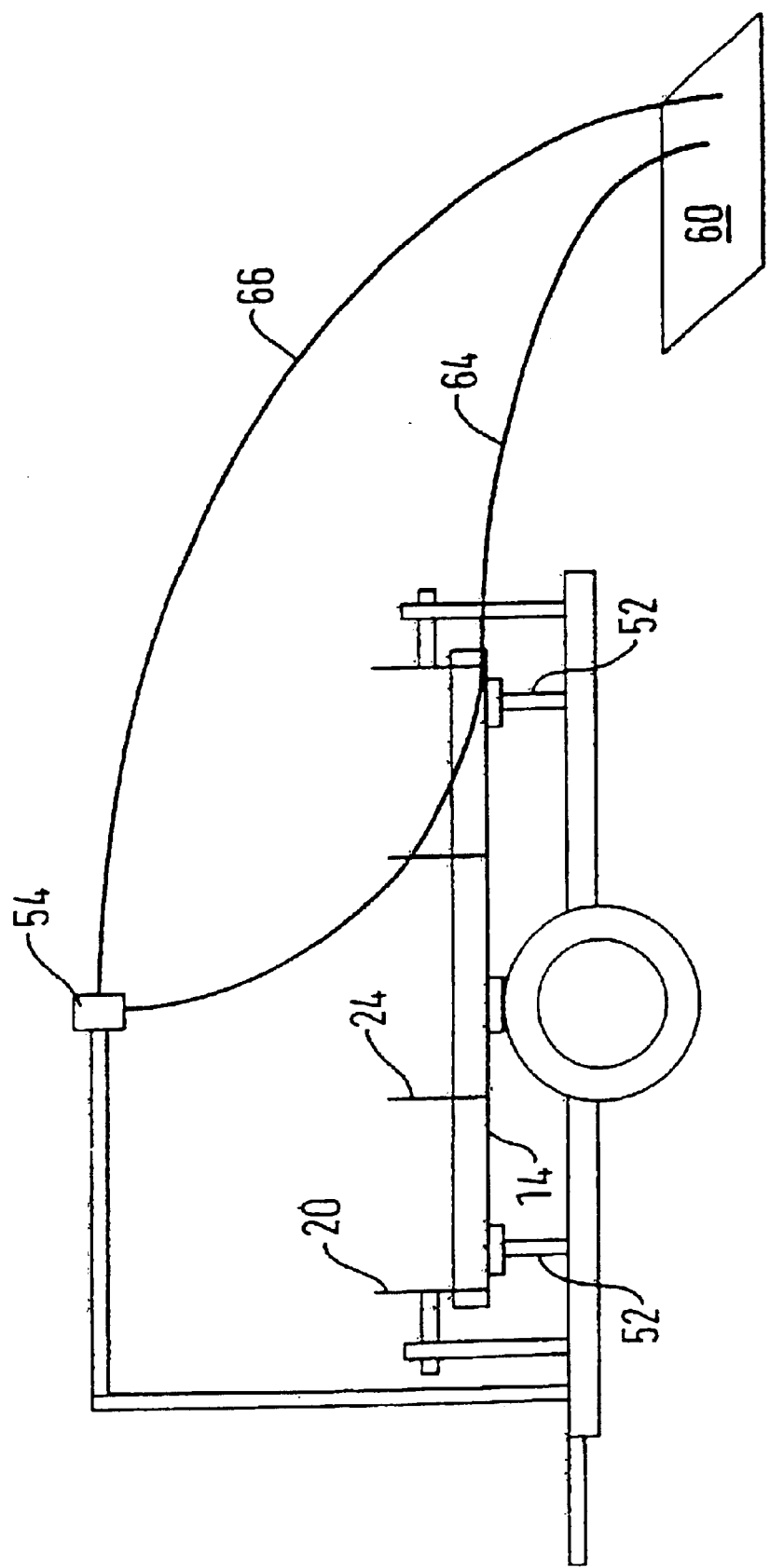

FIG. 8 illustrates the situation when the cable 66 is fully, or almost fully, installed in the second portion of the ducting and no cable remains in a coiled condition in the housing. At this stage the cable 66 is released from the cable guide 54 and the cable 64 is passed through the slot 28 in the side wall 22 of the housing after the gate 30 has been opened. In this way, the cable is free of the housing and the remaining loop of cable can be stored in the pit or passed into the second portion of the ducting. This completes the installation of the cable in the ducting and the apparatus 10 can be towed away for a future installation.

It is to be understood that the first and second portions of the ducting referred to herein are typically discrete ducts with adjacent ends located in the access pit.

In a particular embodiment for use in installing optical fibre cable having an outer diameter of 15 mm and a weight of 150 kg/km, the illustrated housing has a cylindrical side wall 22 with a height of 650 mm and an outer diameter of about 1700 mm and a hub 26 with an outer diameter of about 700 mm. Such a housing is able to house about 4 km of such cable.

What is claimed is:

1. An apparatus for installing a length of cable in ducting from a location intermediate the ends of said ducting, said apparatus comprising:

a generally cylindrical housing for housing the length of cable in a coiled condition, said housing comprising respective end walls removably mounted relative to opposite end portions of a generally cylindrical side wall; and a support means supporting said housing for rotational movement about an axis transverse to an axis of the housing between a first position in which a first one of said opposite end portions is uppermost and a second position in which the a second one of said opposite end portions is uppermost.

2. An apparatus as claimed in claim 1, wherein said support means includes a base and opposed stub axles mounted relative to said base and connected to opposed portions of said housing side wall.

3. An apparatus as claimed in claim 2, wherein said support means includes means for supporting said housing in said first and second positions.

4. An apparatus as claimed in claim 3, wherein said means for supporting said housing in said first and second positions comprises length adjustable supports extending from said base to engage said housing at or adjacent the end portion which is lowermost when said housing is in said first or second position.

5. An apparatus as claimed in claim 2, wherein said base is provided with wheels or endless tracks.

6. An apparatus as claimed in claim 1, wherein a cable guide is positioned above said housing.

7. An apparatus as claimed in claim 1, wherein said end walls are provided with respective hubs which fit one within the other when said end walls are mounted to said opposite end portions of the housing side wall.

8. An apparatus as claimed in claim 1, wherein said housing side wall is provided with a closable aperture through which cable may pass.

9. An apparatus as claimed in claim 1, wherein the housing side wall comprises bars, tubes, or bars and tubes.

10. An apparatus as claimed in claim 1, wherein the housing end walls comprise bars, tubes, or bars and tubes.

11. A method of installing a cable in ducting from a location intermediate the ends of said ducting in an apparatus as claimed in any one of the preceding claims and comprising:

housing the length of cable to be installed in said housing in a coiled condition;

positioning said apparatus adjacent said location with said housing in said first position;

removing the uppermost end wall from the housing;

locating the end of the cable adjacent the end portion of the housing from which the end wall has been removed;

passing said end and part of the length of cable extending therefrom through said end portion of the housing from which the end wall has been removed and into a first portion of the ducting extending from said location;

remounting the removed end wall to the housing;

rotating said housing about said axis transverse to the axis of the housing to said second position;

removing the now uppermost end wall from the housing;

locating the remaining end of the cable and passing that end and the remaining length of the cable extending therefrom through the end portion of the housing from which the end wall has been removed and into a second portion of the ducting extending from said location.

12. A method as claimed in claim 11, wherein said length of cable is fed into said housing at a site remote from said location and said apparatus is transported to said location for positioning adjacent said location.

13. A method of installing a cable in ducting from a location intermediate a first end and a second end of the ducting, the method comprising:

providing a housing containing a length of cable in a coiled condition at said location, said housing having an axis and said coil of cable having a first end and a second end;

arranging said housing in a first orientation and passing a portion of the cable starting from said first end of the coil into a first portion of the ducting that extends from the location to said first end of the ducting, without having to feed the cable onto the ground, so that a remaining portion of the cable remains coiled in the housing; and rotating the housing about an axis transverse to said housing axis to put the housing in a second orientation and passing said remaining portion of the cable starting from said second end of the coil into a second portion of the ducting that extends from the location to said second end of the ducting.

14. A method as claimed in claim 13, wherein said cable is an optical fibre cable.

15. A method as claimed in claim 13, wherein said length of cable is coiled into said housing at a site remote from said ducting, further comprising transporting said housing with said coiled cable housed therein to said location.

16. A method as claimed in claim 13, wherein said housing is rotated through 180° when rotated between said first orientation and said second orientation.

17. A method as claimed in claim 12, wherein said coil has an axis that is transverse to said axis of rotation.

18. A method as claimed in claim 13, wherein said housing does not rotate while said portions of the coil of cable are passed into the ducting.

19. Apparatus for installing a length of cable in ducting from a location intermediate ends of said ducting, said apparatus comprising:

a generally cylindrical housing for housing a length of cable in a coiled condition, said housing having an axis and comprising a generally cylindrical side wall having a first end and a second end, a first end wall removably mounted relative to said first end of the side wall and a second end wall removably mounted relative to said second end of the side wall; and a support for supporting said housing such that the housing can be rotated about art axis transverse to said central axis between a first position in which said first end of the side wall is uppermost and a second position in which said second end of the side wail is uppermost.

20. Apparatus as claimed in claim 19, wherein said housing is provided with opposed stub axles that define said transverse axis and said support comprises respective mountings for said stub axles.

21. Apparatus as claimed in claim 20, wherein said support comprises a member selectively engageable with the housing to prevent rotational movement thereof.

* * * * *

UNITED STATES PATENT AND TRADEMARK OFFICE
CERTIFICATE OF CORRECTION

PATENT NO. : 6,773,205 B2
DATED : August 10, 2004
INVENTOR(S) : Ralph Sutehall

It is certified that error appears in the above-identified patent and that said Letters Patent is hereby corrected as shown below:

<u>Column 6,</u>
Line 38, "claim 12" should read -- claim 13 --.
Line 57, "wail" should read -- wall --.

Signed and Sealed this

Seventh Day of June, 2005

JON W. DUDAS
*Director of the United States Patent and Trademark Office*